(12) United States Patent
Yoon et al.

(10) Patent No.: US 10,377,169 B2
(45) Date of Patent: Aug. 13, 2019

(54) EXTERIOR FORMING METHOD AND EXTERIOR FORMING STRUCTURE OF ELECTRONIC COMPONENT

(71) Applicants: SAMSUNG ELECTRONICS CO., LTD., Suwon-si, Gyeonggi-do (KR); CICT, Incheon (KR)

(72) Inventors: Sung Woon Yoon, Suwon (KR); Sung-Hai Lee, Incheon (KR); Kyo Ree Lee, Suwon (KR); Hui-Cheol Kim, Cheonan (KR); Dae-Keun Youn, Ansan (KR)

(73) Assignees: SAMSUNG ELECTRONICS CO., LTD., Suwon-si (KR); CICT, Incheon (KR)

( * ) Notice: Subject to any disclaimer, the term of this patent is extended or adjusted under 35 U.S.C. 154(b) by 526 days.

(21) Appl. No.: 15/137,622

(22) Filed: Apr. 25, 2016

(65) Prior Publication Data
US 2016/0311142 A1    Oct. 27, 2016

(30) Foreign Application Priority Data
Apr. 23, 2015    (KR) .................... 10-2015-0057546

(51) Int. Cl.
*B41F 3/00*    (2006.01)
*B41J 2/33*    (2006.01)
(Continued)

(52) U.S. Cl.
CPC ........ *B44C 1/1712* (2013.01); *B29C 66/8362* (2013.01); *B29C 2045/0079* (2013.01);
(Continued)

(58) Field of Classification Search
CPC ............ H01H 2239/074; B44C 1/1712; B32B 37/0053; B29C 66/8362; B41F 3/00; B41J 2/325; B41J 2/33
(Continued)

(56) References Cited

U.S. PATENT DOCUMENTS

2015/0104609 A1    4/2015 Chiang et al.

FOREIGN PATENT DOCUMENTS

KR    10-2009-0006426    1/2009
KR        10-1349682    1/2014
(Continued)

OTHER PUBLICATIONS

Korean Office Action dated Jul. 20, 2016 in corresponding Korean Patent Application No. 10-2015-0057546.
(Continued)

*Primary Examiner* — Carson Gross
(74) *Attorney, Agent, or Firm* — Staas & Halsey LLP

(57) ABSTRACT

Disclosed herein are an exterior forming method and an exterior forming structure of an electronic component. The exterior forming method of an electronic component may include mounting an injection-molded product, which is injection molded as an electronic component, to an upper portion a heat transferring base unit, mounting a printing film having an ink layer for a heat transfer to the upper portion of the heat transferring base unit such that the ink layer faces an upper surface of the injection-molded product, and heat-transferring the ink layer on the upper surface of the injection-molded product by rotating a heating roll while closely attached at an upper portion of the printing film. The exterior forming method may also include forming an UV coating layer on an upper portion of the ink layer that is heat-transferred on the injection-molded product.

15 Claims, 10 Drawing Sheets

(51) Int. Cl.
  *B44C 1/17* (2006.01)
  *B29C 45/00* (2006.01)
  *B29C 65/00* (2006.01)
  *B32B 37/00* (2006.01)
  *B41J 2/325* (2006.01)
(52) U.S. Cl.
  CPC ............ *B32B 37/0053* (2013.01); *B41F 3/00* (2013.01); *B41J 2/325* (2013.01); *B41J 2/33* (2013.01); *H01H 2239/074* (2013.01)
(58) Field of Classification Search
  USPC ...................... 156/486; 101/28, 32, 487, 488
  See application file for complete search history.

(56) References Cited

FOREIGN PATENT DOCUMENTS

| KR | 10-2014-0123920 | | 10/2014 |
| KR | 10-2013-0109091 | | 11/2014 |
| KR | 101458893 | B1 * | 11/2014 |
| KR | 10-1513683 | | 4/2015 |
| KR | 10-2014-0130497 | | 6/2015 |

OTHER PUBLICATIONS

Korean Notice of Allowance dated Jan. 18, 2017, in corresponding Korean Patent Application No. 10-2015-0057546.

* cited by examiner

EXTERIOR FORMING METHOD AND EXTERIOR FORMING STRUCTURE OF ELECTRONIC COMPONENT

CROSS-REFERENCE TO RELATED APPLICATION

This application claims the benefit of the Korean Patent Application No. 10-2015-0057546, filed on Apr. 23, 2015, in the Korean Intellectual Property Office, the disclosure of which is incorporated herein by reference.

BACKGROUND

1. Field

Embodiments of the present disclosure relate to an exterior forming method and an exterior forming structure of an electronic component, and more particularly an exterior forming method and an exterior forming structure of an electronic component, capable of forming an exterior (an exterior surface) of an electronic component implemented by injection molding.

2. Description of the Related Art

An injection molding process is referred to as a traditional process capable of mass-producing plastic products, and is also referred to as technology widely used at various functional products including home appliances, automobiles, and mobile devices.

Recently, many exterior components of the various mobile devices and IT-related electronic products are processed by use of the injection molding process as such, and an increased interest in an enhancement of aesthetic beauty of an exterior of an injection-molded product processed as such is present.

Particularly, a method configured to implement luxurious color on an injection-molded exterior product of a mobile device, or a method capable of easily and precisely executing a printing or transferring on an exterior of an injection-molded product having various shapes, for example, the shape of a plane or curve, is actively being conducted.

With respect to the prior art, an example of the above has been suggested in Korean patent publication No. 10-2009-0006426 filed on Jan. 5, 2009, and technical descriptions with respect to an in-mold transferring film for exterior material of electric and electronic products and a manufacturing method thereof has been provided in the above-mentioned publication.

SUMMARY

Therefore, it is an aspect of the present disclosure to provide an exterior forming method and an exterior forming structure of an electronic component, capable of forming an exterior (an exterior surface) of an electronic component implemented by injection molding Additional aspects of the disclosure will be set forth in part in the description which follows and, in part, will be obvious from the description, or may be learned by practice of the disclosure.

In accordance with one aspect of the present disclosure, a method for forming an exterior of an electronic component, the method including: (a) mounting an injection-molded product, which is injection molded as an electronic component, to an upper portion a heat transferring base unit; (b) mounting a printing film having an ink layer for a heat transfer to the upper portion of the heat transferring base unit such that the ink layer faces an upper surface of the injection-molded product; and (c) heat-transferring the ink layer on the upper surface of the injection-molded product by rotating a heating roll while closely attached at an upper portion of the printing film.

In (a), a mounting groove may be formed in the upper portion of the heat transferring base unit, and a position of the injection-molded product may be fixed as a lower end portion of the injection-molded product is mounted through the mounting groove.

In (a), at the upper surface of the injection-molded product, at least one of a SR (Solder Resist) layer and an EMC (Epoxy Molding Compound) layer may be additionally formed.

In (a), the injection-molded product may be a home key to verify fingerprints provided for a mobile device having a fingerprint-verifying sensor.

In (b), the printing film may include a film member and the ink layer provided at a surface of the film member, and the film member may be provided with one end portion thereof fixed to a first fixing member protruded at an upper end of one side of the heat transferring base unit while the other end portion thereof fixed to a second fixing member protruded at an upper end of the other side of the heat transferring base unit, and the ink layer may be provided at a lower surface of the film member while facing the upper surface of the injection-molded product, and the size of an area at which the ink layer is formed may be larger than an area of the upper surface of the injection-molded product.

In (b), the one end portion and the other end portion of the film member may be fixed to have positions identical with respect to each other, and the film member may be horizontally mounted to the upper portion of the heat transferring base unit while having a predetermined distance from the upper surface of the injection-molded product.

Through (c), the ink layer being heat-transferred to the upper surface of the injection-molded product by heating roll may include a plurality of ink layers, and the plurality of functional ink layers may include a first ink layer to provide adhesive force in between the injection-molded product and the ink layer while formed at the upper surface of the injection-molded product; a second ink layer to implement a color while formed at an upper portion of the first ink layer; and a third ink layer to protect the color implemented by the second ink layer and provide gloss while formed at an upper portion of the second ink layer.

In accordance with another aspect of the present disclosure, a method for forming an exterior of an electronic component, the method including: (a) mounting an injection-molded product, which is injection molded as an electronic component, to an upper portion of a heat transferring base unit; (b) mounting a printing film having an ink layer for a heat transfer to the upper portion of the heat transferring base unit such that the ink layer faces an upper surface of the injection-molded product; (c) heat-transferring the ink layer on the upper surface of the injection-molded product by rotating a heating roll while closely attached at an upper portion of the printing film; and (d) forming an UV coating layer on an upper portion of the ink layer that is heat-transferred on the injection-molded product.

A mounting groove may be formed in the upper portion of the heat transferring base unit, and a position of the injection-molded product may be fixed as a lower end portion of the injection-molded product is mounted through the mounting groove.

In (a), at the upper surface of the injection-molded product, at least one of a SR (Solder Resist) layer and an EMC (Epoxy Molding Compound) layer may be additionally formed.

In (a), the injection-molded product may be a home key to verify fingerprints provided for a mobile device having a fingerprint-verifying sensor.

in (b), the printing film may include a film member and the ink layer provided at a surface of the film member, and the film member may be provided with one end portion thereof fixed at a first fixing member protruded at an upper end of one side of the heat transferring base unit while the other end portion thereof fixed at a second fixing member protruded at an upper end of the other side of the heat transferring base unit, and the ink layer may be provided at a lower surface of the film member while facing the upper surface of the injection-molded product, and the size of an area at which the ink layer is formed is larger than an area of the upper surface of the injection-molded product.

In (b), the one end portion and the other end portion of the film member may be fixed to have positions identical with respect to each other, and the film member may be horizontally mounted to the upper portion of the heat transferring base unit while having a predetermined distance with respect to the upper surface of the injection-molded product.

Through (c), the ink layer being heat-transferred to the upper surface of the injection-molded product by the heating roll may include plurality of functional ink layers, and the plurality of functional ink layers may include a first ink layer to provide adhesive force in between the injection-molded product and the ink layer while formed at the upper surface of the injection-molded product; a second ink layer to implement a color while formed at an upper portion of the first ink layer; and a third ink layer to protect the color implemented by use of the second ink layer and provide gloss while formed at an upper portion of the second ink layer.

(d) may include (d-1) mounting injection-molded product having the ink layer heat-transferred thereon to an UV-coating jig, and applying UV material on the upper portion of the ink layer; (d-2) mounting a sheet member to an upper portion of the UV-coating jig and driving a roller on an upper portion of the sheet member; and (d-3) hardening and forming an UV coating layer on the upper portion of the ink layer by radiating UV.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
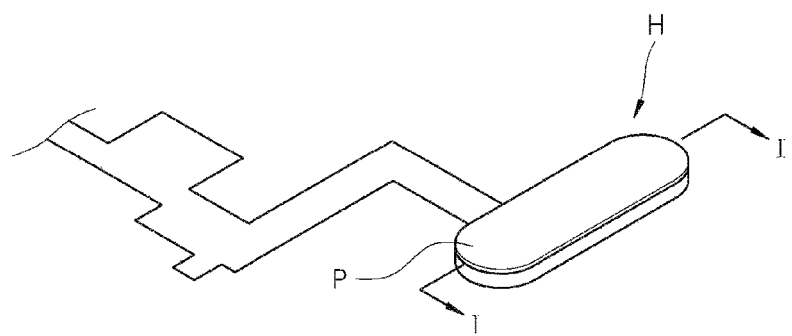
FIG. 1A is a schematic diagram and FIG. 1B is a cross-sectional view schematically illustrating a fingerprint-verifying home key component applied to a mobile device.

Reference will now be made in detail to the embodiments of the present disclosure, examples of which are illustrated in the accompanying drawings, wherein like reference numerals refer to like elements throughout. However, the present disclosure is not limited to the embodiments, and may be implemented in various shapes that are different with respect to each other. However, the embodiments are provided as to complete the disclosure of the present disclosure, and as to completely inform the scope of the present disclosure to those skilled in the art in the area of the technology in which the present disclosure is included. The present disclosure is defined only by the scope of the claims of the present disclosure. The identical reference numerals in the present disclosure are referred to as identical components. With respect to describing the embodiments of the present disclosure, in a case when specific description with respect to a published function or component is determined that the description as such may unnecessarily obscure the substance of the present disclosure, the description as such will be omitted. The terminologies that are to be described in the present disclosure are defined as the terminologies that are defined by considering the functions in the embodiments of the present disclosure, and thus may be changed according to the practice or intention of a user or an administrator. Therefore, the definitions of the terminologies should be determined on the basis of the contents of the entirety of the present disclosure.

In the descriptions hereinafter, an electronic component is referred to a mobile device, for example, a smart phone, or a tablet PC, as well as a component applied to various IT electronic devices, and on FIGS. 1A and 1B, a fingerprint-verifying home key is illustrated as one example of the electronic component as such.

Referring to FIG. 1A, a home key H illustrated is connected through a printed circuit board, and provided to form an exterior while mounted such that one surface, for example, an upper surface, thereof is exposed to an outside of a mobile device.

The one surface, for example, the upper surface, of the home key H is provided with ink layers P (P1, P2, and P3), or referred to as painted layers, each having a predetermined thickness d is formed thereto.

As for detailed example, the P1 ink layer is provided to secure adhesive force while formed at an upper portion of the home key H, that is, a plastic injection-molded product, for example, a PC or a PMMA, and the P2 ink layer is provided to implement colors, while the P3 ink layer formed at a further outer side is configured to provide effects such as color protection and gloss application.

As the ink layers P having the structure as such are formed, the home key H may implement color that is suitable for the mobile device, and may secure clean exterior quality at the identical level of a window glass.

Hereinafter, referring to the attached drawings, an exterior forming method of an electronic component and an exterior forming structure of an electronic component will be described in detail.

The First Embodiment

Figure 2:
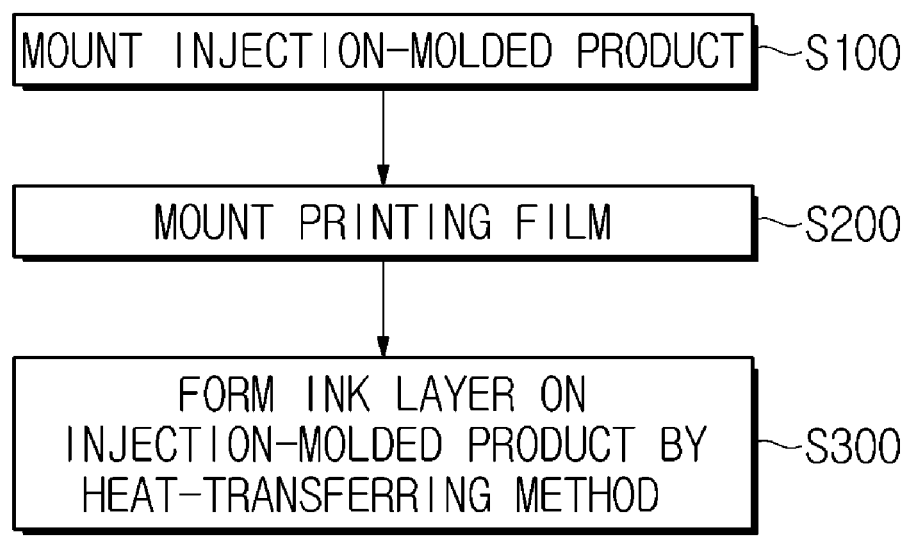
FIG. 2 is a flow chart briefly illustrating an exterior forming method of an electronic component according to a first embodiment of the present disclosure.

FIG. 2 is a flow chart briefly illustrating an exterior forming method of an electronic component according to the first embodiment of the present disclosure.

Referring to FIG. 2, the exterior forming method of the electronic component according to the first embodiment of the present disclosure as illustrated includes an injection-molded product mounting operation (S100), a printing film mounting operation (S200), and an ink layer forming operation (S300).

Figure 3:
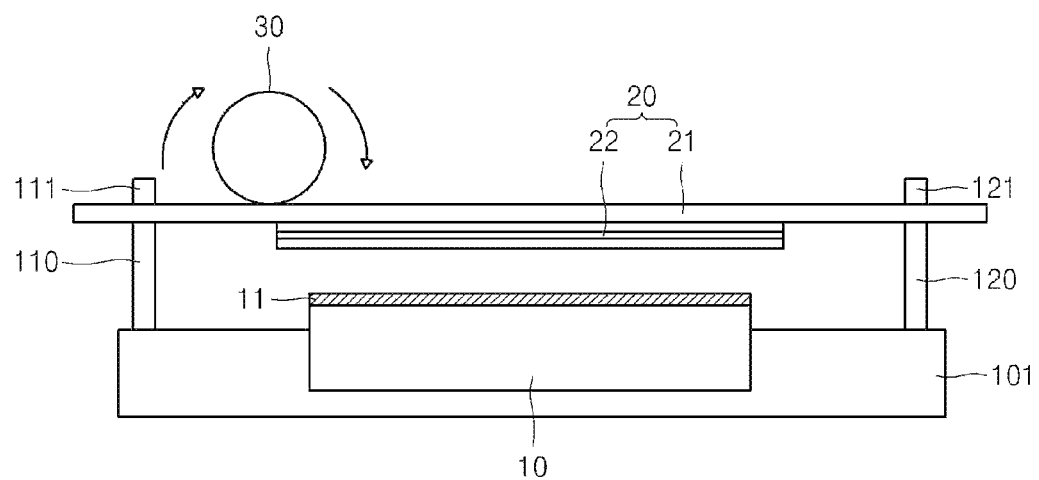
FIG. 3 and FIG. 4 are process drawings illustrated as to describe the exterior forming method of an electronic component according to a first embodiment of the present disclosure.
Figure 4:
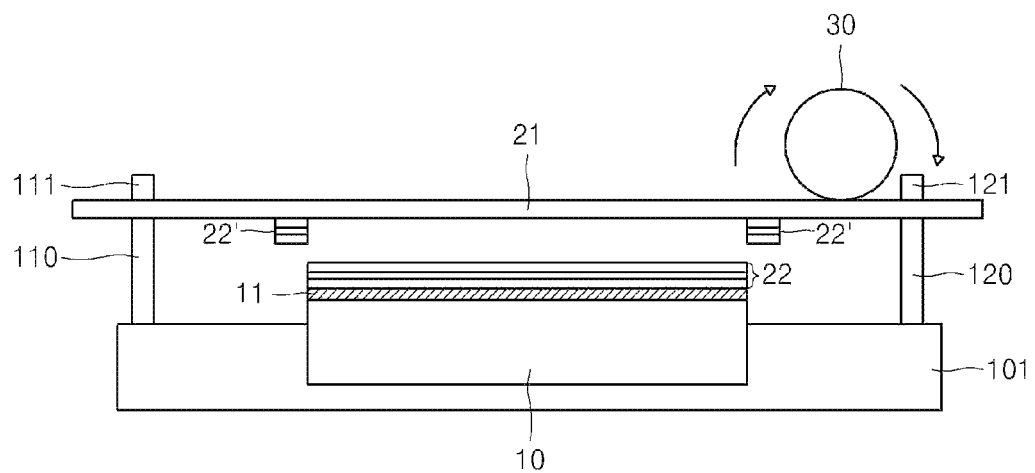

FIG. 2 to FIG. 4 are process drawings illustrated as to describe the exterior forming method of the electronic component according to the first embodiment of the present disclosure. The process of the each operation will be described by referring to the process drawings as such.

The Infection-Molded Product Mounting Operation (S100)

Operation S100 is referred to as an injection-molded product mounting operation, and corresponds to an operation to mount the injection-molded product, which is injection-molded as an electronic component, to an upper portion of a heat transferring base unit.

Referring to FIG. 3, a plastic injection-molded product 10, for example, a PC or a PMMA, which is hereinafter to be referred to as an injection-molded product, injection molded as an electronic component, may be mounted to an upper portion of a heat transferring base unit 101.

Figure 1B:
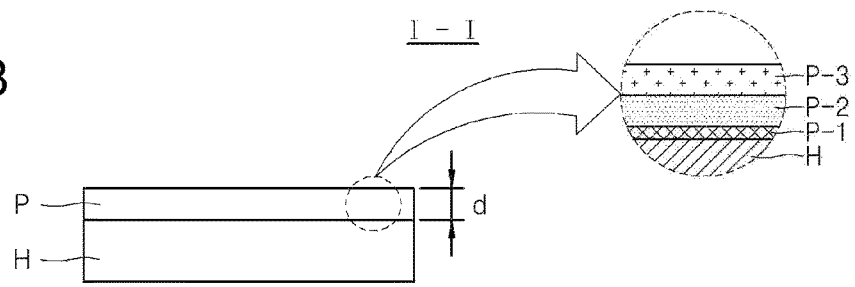

The injection-molded product 10 may be an electronic component, particularly an exterior component of an electronic device, and the fingerprint-verifying home key H (FIGS. 1A and 1B) illustrated on FIGS. 1A and 1B may correspond as such.

For example, a mounting groove may be formed at the upper portion of the heat transferring base unit 101.

A lower end portion of the injection-molded product 10 may be mounted through the mounting groove, and the position of the injection-molded product 10 may be fixed.

However, the cross-sectional shapes of the heat transferring base unit 101 and the injection-molded product 10 are not limited to the illustrated shapes, and may be implemented after changed into various shapes.

In addition, an upper surface of the injection-molded product 10 may be provided with at least one layer 11 of a SR (Solder Resist) layer and an EMC (Epoxy Molding Compound) layer formed thereto, and in the case as such, an ink layer may be heat-transferred at the upper surface of the heat transferring base unit 101 according to the first embodiment of the present disclosure.

In a case when the injection-molded product 10 is the fingerprint-verifying home key H (FIGS. 1A and 1B) provided for a mobile device, the injection-molded product 10 may be provided with a functional electronic component, for example, a fingerprint-verifying sensor, in an embedded form.

Meanwhile, the upper surface of the injection-molded product 10, that is, an exterior surface, may be used even in a case when the exterior surface is provided in the shape of a plane or curve, and is not limited hereto.

The Printing Film Mounting Operation (S200)

The present operation is referred to as a printing film mounting operation, and corresponds to a operation to settle the printing film having the above ink layer at the upper portion of the upper portion of the heat transferring base unit so that the heat transferring ink layer may face the upper portion of the injection-molded product.

Referring to FIG. 3, the printing film 20 is mounted at the upper portion of the injection-molded product 10. Here, the printing film 20 may include a film member 21, and an ink layer 22 provided at a surface, particularly a lower surface, of the film member 21.

As a detailed example, the film member 21 is provided with one end portion thereof fixed at a first fixing member 110 protruded at an upper end portion of one side of the heat transferring base unit 101 while the other end portion thereof fixed at a second fixing member 120 protruded at an upper end portion of the other side of the heat transferring base unit 101.

End portions of the each of the first fixing member 110 and the second fixing member 120 may be provided with a first fixing pin 111 and a second fixing pin 121 thereto, respectively, so that the height of the film member 21 may be fixed.

The fixing heights of the one end portion and the other end portion of the film member 21 are formed to be identical with respect to each other, and the film member 21 may be horizontally mounted at the upper portion of the heat transferring base unit 101 while having a predetermined distance with respect to the upper surface of the injection-molded product 10.

Meanwhile, the ink layer 22 is provided at a lower surface of the film member 21 while facing the upper surface of the injection-molded product 10, and at this time, the size of the area at which the ink layer 22 is formed is preferred to be formed to be larger than the area of the upper surface of the injection-molded product 10.

The Ink Layer Forming Operation (S300)

The present operation is referred to as an ink layer forming operation, and corresponds to a operation to heat-transfer the ink layer the an upper surface of the injection-molded product by closely attaching and rotating a heating roll at an upper portion of the printing film.

Referring to FIG. 3, as a heating roll 30 heated at a predetermined temperature is closely attached and rotated, the heating roll 30 may press the printing film 20 toward the injection-molded product 10 so that the ink layer 22 may be heat-transferred to the upper surface of the injection-molded product 10.

FIG. 4 is provided to show an image of an ink layer scrap 22' remaining at the film member 21 after the ink layer 22 formed at a lower surface of the film member 22 is heat-transferred to the upper surface of the injection-molded product 10 by use of the closely attached rotation of the heating roll 30.

That is, through the present operation, the ink layer 22 is heat-transferred within a range of a predetermined measurement at the upper surface of the injection-molded product 10, and the ink layer scrap 22 is remained at the film member 21 at the area outside the range of the predetermined measurement at the upper surface of the injection-molded product 10. From the above, the heat-transferring task of the ink layer 22 with respect to the injection-molded product 10 formed in the form of an electronic component is conducted.

Meanwhile, the ink layer 22 heat-transferred to upper surface of the injection-molded product 10 by use of the heating roll 30 may include a plurality of ink layers.

For example, the ink layer may include a first ink layer to provide adhesive force in between the injection-molded product 10 and the ink layer 22 while formed at the upper surface of the injection-molded product 10, a second ink layer to implement color while formed at the upper surface of the injection-molded product 10, and a third ink layer to protect the color implemented through the second ink layer and provide gloss while formed at the upper surface of the injection-molded product 10, and the plurality of ink layers as such may be formed in larger or smaller number of layers than the number of the above layers.

Meanwhile, as in the first embodiment of the present disclosure, if reliability, such as hardness, may be secured by use of only the task of heat-transferring the ink layer 22 through the upper surface of the injection-molded product 10, that is, an exterior surface of the injection-molded product, the forming task of the exterior of the electronic component may be completed by having the Ink Layer Forming Operation (S300) as the last operation.

Figure 5:
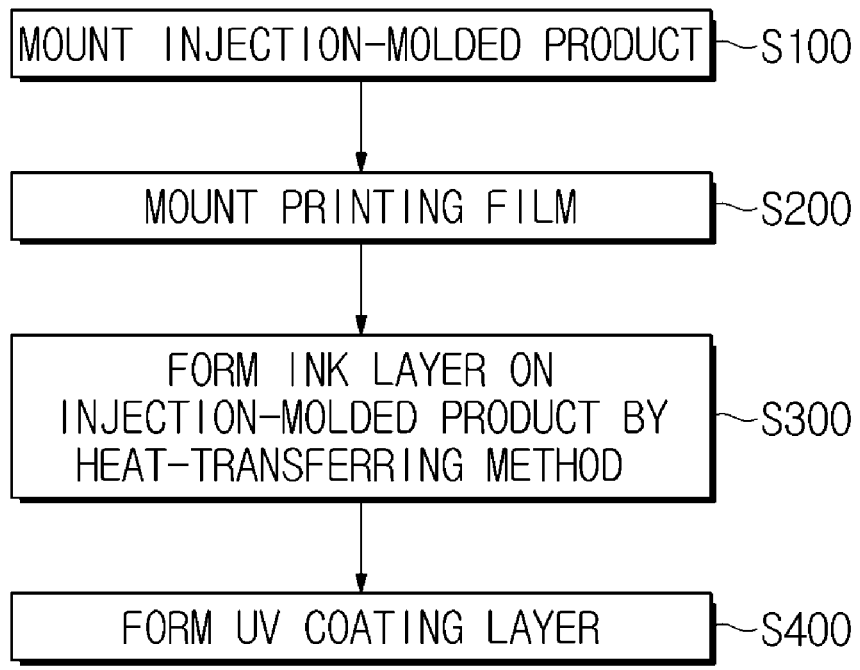
FIG. 5 is a flow chart briefly illustrating an exterior forming method of an electronic component according to a second embodiment of the present disclosure.

However, if the reliability, for example, the hardness, may not be secured by any measure through the above operation, an UV coating layer forming operation (S400: FIG. 5) may further be conducted as in a second embodiment of the present disclosure, which is to be described later.

For example, in a case when the ink layer 22 (FIG. 4) formed at the upper surface of the injection-molded product 10 is in a thick state, the surface hardness may be weakened as the drying of the ink layer 22 (FIG. 4) is provided to be vulnerable, and thus the UV coating layer is preferred to be formed. Differently from the above, in a case when the ink layer 22 (FIG. 4) formed in a thin state, the drying of the ink layer 22 (FIG. 4) may be conducted without difficulty, and thus the surface hardness may be secured up to a desired level, and the UV coating layer is not needed to be formed separately.

The Second Embodiment

FIG. 5 is a flow chart briefly illustrating an exterior forming method of an electronic component according to a second embodiment of the present disclosure.

Referring to FIG. 5, the exterior forming method of the electronic component according to the second embodiment of the present disclosure as illustrated includes an injection-molded product mounting operation (S100), a printing film mounting operation (S200), an ink layer forming operation (S300), and an UV coating layer forming operation (S400).

Figure 6:
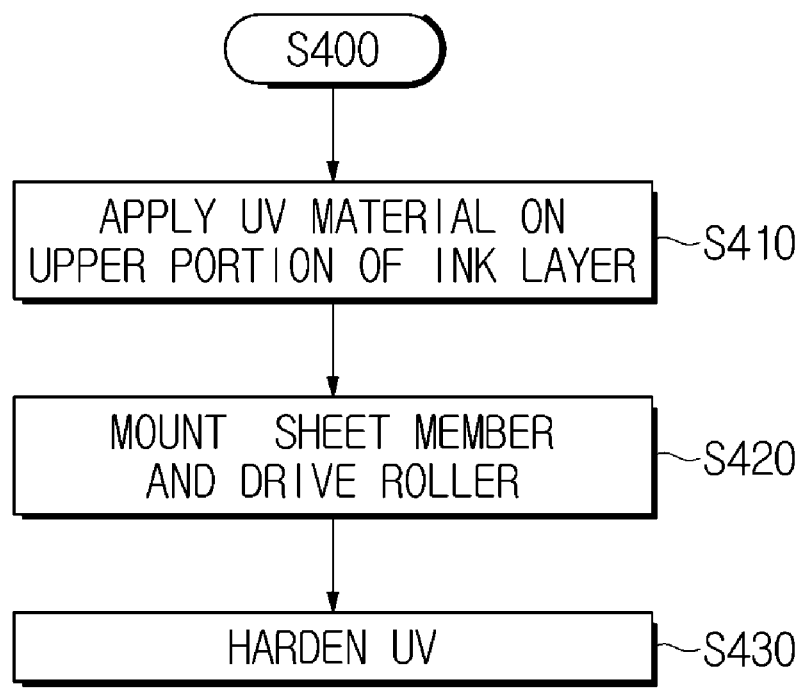
FIG. 6 is a flow chart briefly illustrating detailed operations of a forming operation of an UV coating layer (S400) of FIG. 5.

Referring to FIG. 6, the UV coating layer forming operation (S400), as detailed operations thereof, includes an UV material applying operation (S410), a sheet member mounting and a roller driving operation (S420), and an UV hardening operation (S430).

FIG. 7 to FIG. 10 are process drawings illustrated as to describe the exterior forming method of the electronic component according to the second embodiment of the present disclosure, and referring to the drawings as such, the process of the each operation will be described.

The Injection-Molded Product Mounting Operation (S100)

The present operation is referred to as an injection-molded product mounting operation, and corresponds to an operation to mount the injection-molded product, which is injection-molded as an electronic component, to an upper portion of a heat transferring base unit.

Figure 7:
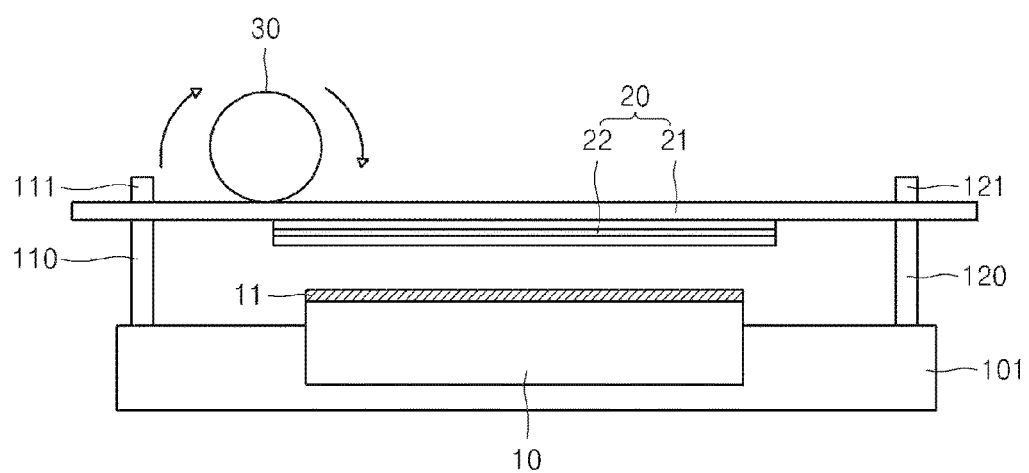
FIGS. 7 to 10 are process drawings illustrated as to describe the exterior forming method of an electronic component according to a second embodiment of the present disclosure.

Referring to FIG. 7, an molded product 10 injection molded using plastic, for example, a PC or a PMMA, as an electronic component, which is hereinafter to be referred to as an injection-molded product, may be mounted to an upper portion of a heat transferring base unit 101.

The injection-molded product 10 may be an electronic component, particularly an exterior component of an electronic device, and the fingerprint-verifying home key H (FIGS. 1A and 1B) illustrated on FIGS. 1A and 1B may correspond as such.

For example, a mounting groove may be formed at the upper portion of the heat transferring base unit 101.

A lower end portion of the injection-molded product 10 may be mounted through the mounting groove, and the position of the injection-molded product 10 may be fixed.

However, the cross-sectional shapes of the heat transferring base unit 101 and the injection-molded product 10 are not limited to the illustrated shapes, and may be implemented after changed into various shapes.

In addition, an upper surface of the injection-molded product 10 may be provided with at least one layer 11 of a SR (Solder Resist) layer and an EMC (Epoxy Molding Compound) layer formed thereto, and in the case as such as well, an ink layer may be heat-transferred at the upper surface of the heat transferring base unit 101 according to the first embodiment of the present disclosure.

In a case when the injection-molded product 10 is the fingerprint-verifying home key H (FIGS. 1A and 1B) provided for a mobile device, the injection-molded product 10 may be provided with a functional electronic component, for example, a fingerprint-verifying sensor, in an embedded form.

Meanwhile, the upper surface of the injection-molded product 10, that is, an exterior surface, may be used even in a case when the exterior surface is provided in the shape of a plane or curve, and is not limited hereto.

The Printing Film Mounting Operation (S200)

The present operation is referred to as a printing film mounting operation, and corresponds to a operation to settle the printing film having the above ink layer at the upper portion of the upper portion of the heat transferring base unit so that the heat transferring ink layer may face the upper portion of the injection-molded product.

Referring to FIG. 7, the printing film 20 is mounted at the upper portion of the injection-molded product 10. Here, the printing film 20 may include a film member 21, and an ink layer 22 provided at a surface, particularly a lower surface, of the film member 21.

As a detailed example, the film member 21 is provided with one end portion thereof fixed at a first fixing member 110 protruded at an upper end portion of one side of the heat transferring base unit 101 while the other end portion thereof fixed at a second fixing member 120 protruded at an upper end portion of the other side of the heat transferring base unit 101.

End portions of the each of the first fixing member 110 and the second fixing member 120 may be provided with a first fixing pin 111 and a second fixing pin 121 thereto, respectively, so that the height of the film member 21 may be fixed.

The fixing heights of the one end portion and the other end portion of the film member 21 are formed to be identical with respect to each other, and the film member 21 may be horizontally mounted at the upper portion of the heat transferring base unit 101 while having a predetermined distance with respect to the upper surface of the injection-molded product 10.

Meanwhile, the ink layer 22 is provided at a lower surface of the film member 21 while facing the upper surface of the injection-molded product 10, and at this time, the size of the area at which the ink layer 22 is formed is preferred to be formed to be larger than the area of the upper surface of the injection-molded product 10.

The Ink Layer Forming Operation (S300)

The present operation is referred to as an ink layer forming operation, and corresponds to an operation to heat-transfer the ink layer at the upper surface of the injection-molded product by closely attaching and rotating a heating roll at an upper portion of the printing film.

Referring to FIG. 7, as a heating roll 30 heated at a predetermined temperature is closely attached and rotated, the heating roll 30 may press the printing film 20 toward the injection-molded product 10 so that the ink layer 22 may be heat-transferred to the upper surface of the injection-molded product 10.

Figure 8:
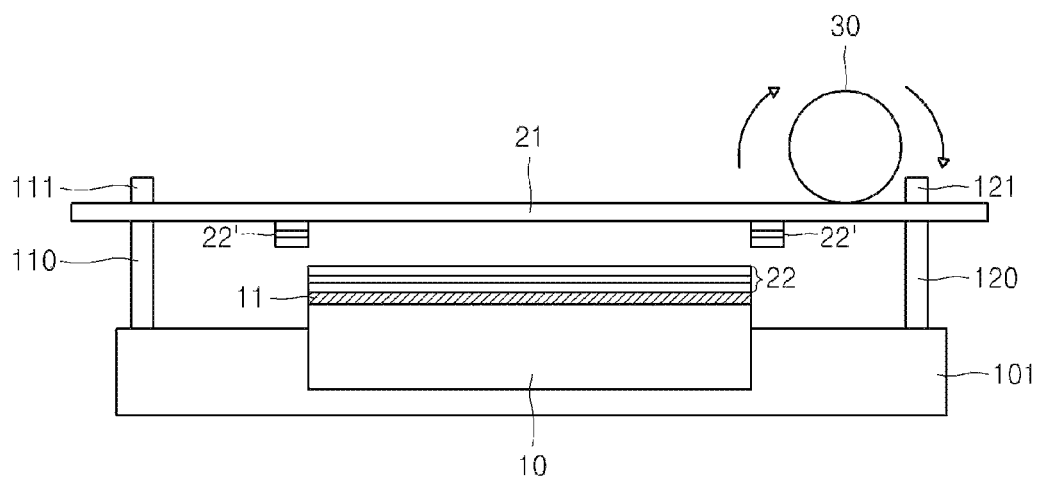

FIG. 8 is provided to show an image of an ink layer scrap 22' remaining at the film member 21 after the ink layer 22 formed at a lower surface of the film member 22 is heat-transferred to the upper surface of the injection-molded product 10 by use of the closely attached rotation of the heating roll 30.

That is, through the present operation, the ink layer 22 is heat-transferred within a range of a predetermined measurement at the upper surface of the injection-molded product 10, and the ink layer scrap 22 is remained at the film member 21 at the area outside the range of the predetermined measurement at the upper surface of the injection-molded product 10. From the above, the heat-transferring task of the ink layer 22 with respect to the injection-molded product 10 formed in the form of an electronic component is conducted.

Meanwhile, the ink layer 22 heat-transferred to upper surface of the injection-molded product 10 by use of the heating roll 30 may include a plurality of ink layers.

For example, the ink layer may include a first ink layer to provide adhesive force in between the injection-molded product 10 and the ink layer 22 while formed at the upper surface of the injection-molded product 10, a second ink layer to implement color while formed at the upper surface of the injection-molded product 10, and a third ink layer to protect the color implemented through the second ink layer and provide gloss while formed at the upper surface of the injection-molded product 10, and the plurality of ink layers as such may be formed in larger or smaller number of layers than the number of the above layers.

The UV Coating Layer Forming Operation (S400)

The present operation is referred to as an UV coating layer forming operation, and corresponds to an operation to form an UV coating layer at an upper portion of an ink layer heat-transferred at the injection-molded product.

If, as in the previous operation, the reliability, such as the hardness, may be secured by use of only the task of heat-transferring the ink layer 22 through the upper surface of the injection-molded product 10, that is, an exterior surface of the injection-molded product, the forming task of the exterior of the electronic component may be completed by having the Ink Layer Forming Operation (S300) as the last operation. However, if the reliability, for example, the hardness, may not be secured by any measure through the above operation, an UV coating layer may be formed through the present operation.

As illustrated on FIG. 6, the present operation includes the UV material applying operation (S410), the sheet member mounting and the roller driving operation (S420), and the UV hardening operation (S430).

Figure 9:
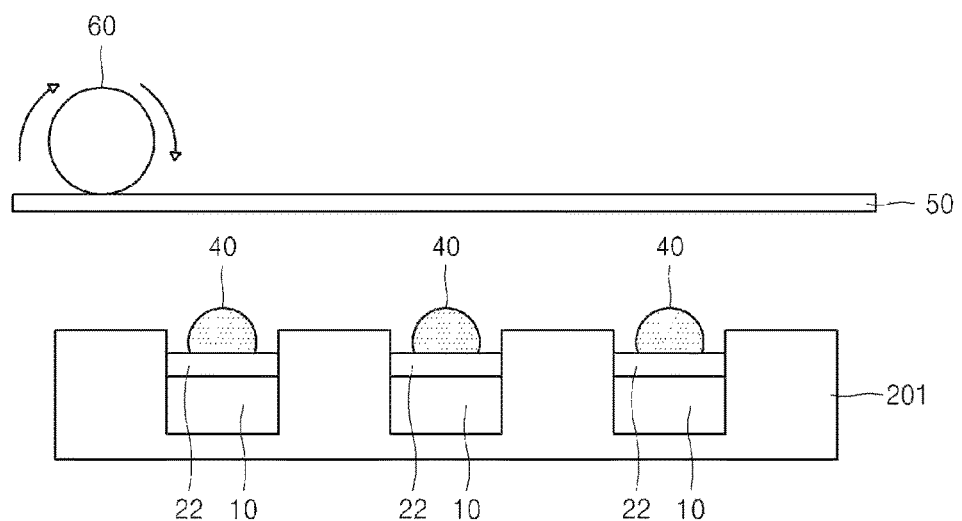

Referring to FIG. 9, the UV material applying operation (S410) may be conducted by applying UV material 40 at an upper portion of the ink layer 22 after the injection-molded product 10 at which the ink layer 22 is heat-transferred at an UV-coating jig 201.

Here, the UV-coating jig 201 may be provided with a plurality of mounting grooves. According to the above, the UV coating layer forming task may be simultaneously conducted with respect to the plurality of injection-molded product 10 through the plurality of mounting grooves at an inside of the single UV-coating jig 201. As for the UV material 40, UV resin may be used.

Next, after the sheet member 50 is mounted at an upper portion of the UV-coating jig 201, the sheet member mounting and the roller driving operation (S420) to drive a roller 60 to an upper portion of the sheet member 50 may be conducted.

Here, the sheet member 50 is preferred to be a PC (Poly Carbonate) sheet, but is not necessarily limited hereto, and a sheet provided with different variety of material may be used.

Figure 10:
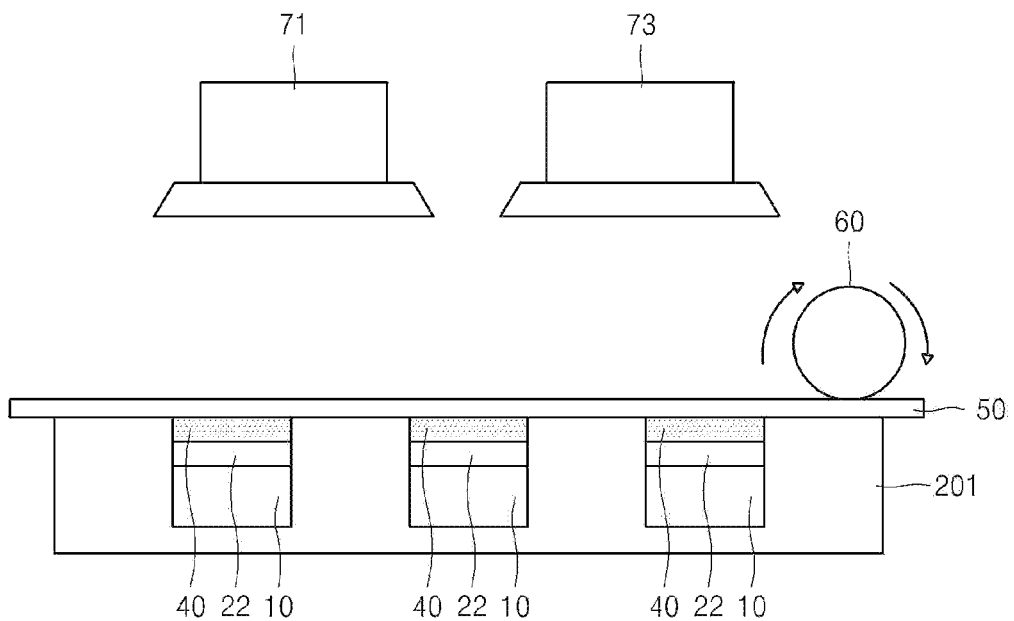

Next, as illustrated on FIG. 10, after the UV coating layer is evenly formed to the upper portion of the ink layer 22 from the lower portion of the sheet member 50 by use of the driving of the roller 60, the UV hardening operation (S430) to harden the UV coating layer by radiating the UV may be conducted.

At this time, with respect to a method of radiating the UV, the UV hardening is preferred to be conducted in a plurality of times by use of a plurality of UV radiating apparatuses, and a first UV hardening task by use of a first UV radiating apparatus 71 and a second UV hardening task by use of a second UV radiating apparatus 73 may be sequentially performed, but is not limited hereto.

As the above, in a case when the ink layer 22 formed at the upper portion of the injection-molded product 10 is provided in a thick state, the surface hardness may be weakened as the drying of the ink layer 22 is provided to be vulnerable, and thus the UV coating layer 40 may be formed at the upper portion of the ink layer 22.

As is apparent from the above, an exterior forming method and an exterior forming structure of an electronic product, capable of forming an exterior (an external surface) of an electronic component implemented by injection molding, can be provided.

As an example, a luxurious printing expression, for example, an expression by use of colors and metallic colors, at an injection-molded product forming an exterior of an electronic product, such as a PC or a PMMA, may be conducted, and an implementation of a printing or transferring on various shapes, for example, plane surfaces or curved surfaces, may be conducted.

In addition, the present disclosure can be applied to implication of an exterior of an injection molded product integrally formed with a functional electronic component, and also can be applied to an exterior surface of SR(Solder Resist), EMC (Epoxy Molding Compound).

In addition, work hours to form an exterior of an electronic component formed through an injection molding can be reduced, and mass production can be conducted as continuous processes.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method for forming an exterior of an electronic component, the method comprising:
   (a) mounting an injection-molded product, which is injection molded as an electronic component, to an upper portion of a heat transferring base unit;
   (b) mounting a printing film having an ink layer for a heat transfer to the upper portion of the heat transferring base unit such that the ink layer faces an upper surface of the injection-molded product; and (c) heat-transferring the ink layer on the upper surface of the injection-molded product by rotating a heating roll while closely attached at an upper portion of the printing film.

2. The method of claim 1, wherein:
in (a), a mounting groove is formed in the upper portion of the heat transferring base unit, and
a position of the injection-molded product is fixed as a lower end portion of the injection-molded product is mounted through the mounting groove.

3. The method of claim 1, wherein:
in (a), at the upper surface of the injection-molded product, at least one of a SR (Solder Resist) layer and an EMC (Epoxy Molding Compound) layer is additionally formed.

4. The method of claim 1, wherein:
in (a), the injection-molded product is a home key to verify fingerprints provided for a mobile device having a fingerprint-verifying sensor.

5. The method of claim 1, wherein:
in (b), the printing film comprises a film member and the ink layer provided at a surface of the film member, and
one end portion of the film member is fixed to a first fixing member protruding upward from one side of the heat transferring base unit, and
the other end portion of the film member is fixed to a second fixing member protruding upward from the other side of the heat transferring base unit, and
the ink layer is provided at a lower surface of the film member while facing the upper surface of the injection-molded product, and a size of an area at which the ink layer is formed is larger than an area of the upper surface of the injection-molded product.

6. The method of claim 5, wherein:
in (b), the one end portion and the other end portion of the film member are fixed to have fixing heights identical with respect to each other, and
the film member is horizontally mounted to the upper portion of the heat transferring base unit while having a predetermined distance from the upper surface of the injection-molded product.

7. The method of claim 1, wherein:
through (c),
the ink layer being heat-transferred to the upper surface of the injection-molded product by heating roll comprises a plurality of functional ink layers, and
the plurality of functional ink layers comprises a first ink layer to provide adhesive force in between the injection-molded product and the ink layer while formed at the upper surface of the injection-molded product; a second ink layer to implement a color while formed at an upper portion of the first ink layer; and a third ink layer to protect the color implemented by the second ink layer and provide gloss while formed at an upper portion of the second ink layer.

8. A method for forming an exterior of an electronic component, the method comprising:
(a) mounting an injection-molded product, which is injection molded as an electronic component, to an upper portion of a heat transferring base unit;
(b) mounting a printing film having an ink layer for a heat transfer to the upper portion of the heat transferring base unit such that the ink layer faces an upper surface of the injection-molded product;
(c) heat-transferring the ink layer on the upper surface of the injection-molded product by rotating a heating roll while closely attached at an upper portion of the printing film; and
(d) forming an UV coating layer on an upper portion of the ink layer that is heat-transferred on the injection-molded product.

9. The method of claim 8, wherein:
a mounting groove is formed in the upper portion of the heat transferring base unit, and
a position of the injection-molded product is fixed as a lower end portion of the injection-molded product is mounted through the mounting groove.

10. The method of claim 8, wherein:
in (a), at the upper surface of the injection-molded product, at least one of a SR (Solder Resist) layer and an EMC (Epoxy Molding Compound) layer is additionally formed.

11. The method of claim 8, wherein:
in (a), the injection-molded product is a home key to verify fingerprints provided for a mobile device having a fingerprint-verifying sensor.

12. The method of claim 8, wherein:
in (b), the printing film comprises a film member and the ink layer provided at a surface of the film member, and
one end portion of the film member is fixed at a first fixing member protruding upward from one side of the heat transferring base unit, and
the other end portion of the film member is fixed at a second fixing member protruding upward from the other side of the heat transferring base unit, and
the ink layer is provided at a lower surface of the film member while facing the upper surface of the injection-molded product, and a size of an area at which the ink layer is formed is larger than an area of the upper surface of the injection-molded product.

13. The method of claim 12, wherein:
in (b), the one end portion and the other end portion of the film member are fixed to have fixing heights identical with respect to each other, and
the film member is horizontally mounted to the upper portion of the heat transferring base unit while having a predetermined distance with respect to the upper surface of the injection-molded product.

14. The method of claim 8, wherein:
through (c),
the ink layer being heat-transferred to the upper surface of the injection-molded product by the heating roll comprises a plurality of functional ink layers, and
the plurality of functional ink layers comprises a first ink layer to provide adhesive force in between the injection-molded product and the ink layer while formed at the upper surface of the injection-molded product; a second ink layer to implement a color while formed at an upper portion of the first ink layer; and a third ink layer to protect the color implemented by use of the second ink layer and provide gloss while formed at an upper portion of the second ink layer.

15. The method of claim 8, wherein:
(d) comprises (d-1) mounting injection-molded product having the ink layer heat-transferred thereon to an UV-coating jig, and applying UV material on the upper portion of the ink layer;
(d-2) mounting a sheet member to an upper portion of the UV-coating jig and driving a roller on an upper portion of the sheet member; and (d-3) hardening and forming an UV coating layer on the upper portion of the ink layer by radiating UV.

* * * * *